N. E. CLARK.
MACHINE FOR MAKING EXPANDED METAL.
APPLICATION FILED FEB. 23, 1906. RENEWED JAN. 17, 1914.

1,103,034.

Patented July 14, 1914.
9 SHEETS—SHEET 1.

Witnesses
Chas. A. Pearl
R. S. Allyn

Inventor
N. E. Clark
By his Attorneys

N. E. CLARK.
MACHINE FOR MAKING EXPANDED METAL.
APPLICATION FILED FEB. 23, 1906. RENEWED JAN. 17, 1914.

1,103,034.

Patented July 14, 1914.
9 SHEETS—SHEET 6.

N. E. CLARK.
MACHINE FOR MAKING EXPANDED METAL.
APPLICATION FILED FEB. 23, 1906. RENEWED JAN. 17, 1914.

1,103,034.

Patented July 14, 1914.

UNITED STATES PATENT OFFICE.

NORRIS ELMORE CLARK, OF PLAINVILLE, CONNECTICUT, ASSIGNOR TO THE NATIONAL METAL FABRIC COMPANY, OF NEW YORK, N. Y., A CORPORATION OF NEW YORK.

MACHINE FOR MAKING EXPANDED METAL.

1,103,034.           Specification of Letters Patent.        Patented July 14, 1914.

Application filed February 23, 1906, Serial No. 302,406. Renewed January 17, 1914. Serial No. 812,815.

*To all whom it may concern:*

Be it known that I, NORRIS ELMORE CLARK, a citizen of the United States, residing at Plainville, Hartford county, Connecticut, (post-office address Plainville, Connecticut,) have invented certain new and useful Improvements in Machines for Making Expanded Metal, of which the following is a full, clear, and exact description.

My invention relates to improvements in sheet metal working, and particularly expanded metal.

My former Patents, Nos. 767,798 and 788,093, illustrate the broad principles of the process and the product. In this application I have illustrated mechanism for carrying out the complete process, and in an improved form and producing expanded metal of greater strength and uniformity.

It is my further object to provide apparatus for economically producing the expanded metal in long, flat strips or sheets. The method set forth herein is claimed in my Patent #1,062,768 issued May 27th, 1913.

The accompanying nine sheets of drawings illustrate the preferred means by which the objects are attained.

I consider the details by which the process is carried out as important in the art, but I do not wish it understood that I am limited to the particular mechanism shown and described.

The preferred product is useful for lathing, ventilated lockers, guards for windows, trees, etc., ornamental gratings, reinforcements, general fire proof construction, etc., and is claimed in my application #323,451, filed June 26, 1906. I have also shown another construction which may be produced according to my method herein set forth and which is particularly adapted for use in relatively narrow strips, such as for fences and the like this is claimed in my application #441,959, filed July 6th, 1908. The use to which the product is put is, however, immaterial.

Fig. 34 is a diagrammatic view of mechanism for carrying out the complete process.

The method of performing the different operations will be better understood by taking up the construction of the mechanism for slitting or lancing the metal in the original strip.

Sheet one shows the mechanism for lancing. This is more fully described and claimed in my Patent No. 875153, dated Dec. 31, 1907. 1 indicates a stationary bed. 2 is a die having projections 3—3 spaced apart from each other. 4—4 are projections of the same size and general arrangement, but alternating in the longitudinal direction with the projections 3—3 as will be better understood hereafter. 5 is the movable gate or head of the machine carrying a punch 6. This punch has a series of projections 7—7 corresponding to the spaces between the projections 3—3 of the die. The ends of the projections are concaved slightly, as at 7' preferably, and the lower corners are slightly beveled. 8—8 are projections similar to 7—7 but alternating in longitudinal arrangement and corresponding to the spaces between the projections 4—4 of the die. The ends of the projections 8 are also concaved, as at 8', and have their corners slightly beveled. 9 is a bridge or table carried by the die and whose purpose will be understood hereinafter. The space between the adjacent ends of the projections 3 and 4 depends upon the size of the mesh which it is desired to have in the finished product. Approximately, the distance between the projections 7 and 8 of the punch is equal to one-half the length of the slit plus one and one-half times the length of the bond between the slits.

Figures 25, 26:
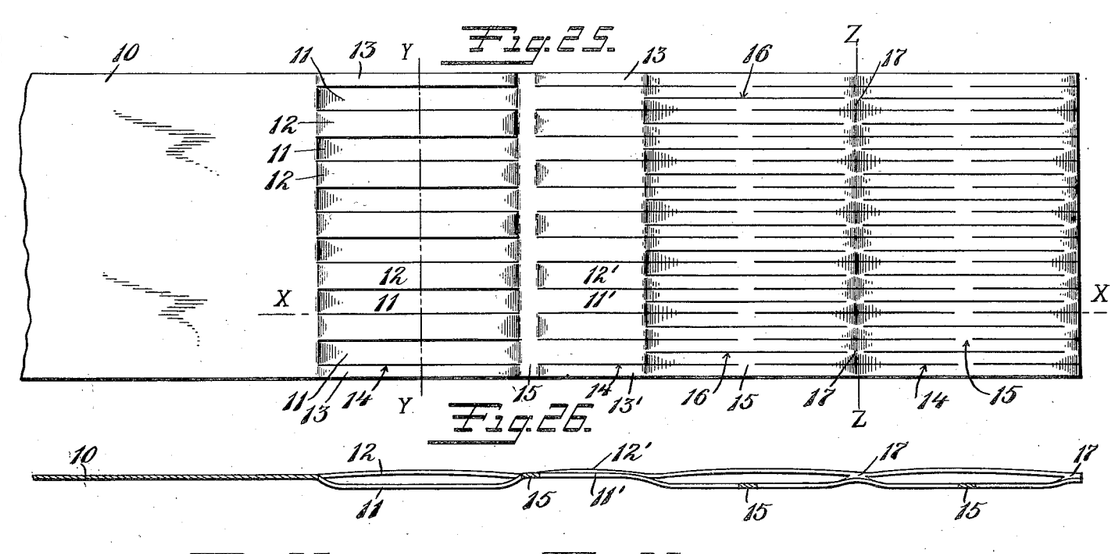
Fig. 25 shows a fragment of a strip of metal after it has been acted upon by the slitting or lancing mechanism.
Fig. 26 is a longitudinal sectional view of the same on the plane of the line X—X Fig. 25.
Figure 27:
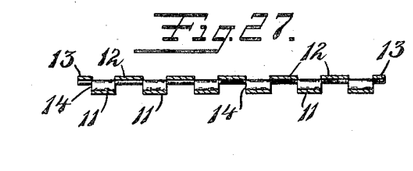
Fig. 27 is a transverse sectional view on the plane of the line Y—Y Fig. 25.
Figure 28:
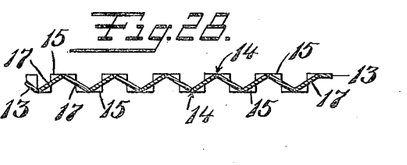
Fig. 28 is a transverse sectional view on the plane of the line Z—Z Fig. 25. These three last figures show the condition of the slitted strip in somewhat exaggerated form.

Sheet 6 shows the product of the lancing or slitting mechanism, in which 10 illustrates the metal of the original strip. 11—11 indicate depressed portions formed by the action of the projections 7—7 of the punch, leaving the portions 12—12 between them. The slits 14 between the parts 11 and 12 are formed by the shearing or lancing action of the punch. Figs. 26, 27 and 28 illustrate the slitting, but on an exaggerated scale. The upward bulging of the parts 12 is due to the slight foreshortening of the entire strip due to the depression of the part 11. The parts are so proportioned as to leave the strips or strands 13—13 on the outer edges. The strip 10 is fed along a distance equal approximately to the length of the slit plus the length of a bond. The metal slitted as just described, then comes under the action of the punch projections 8—8, which are alternated or offset from the first series of projections 7—7, and cause a second series of slits alternating with the first. At the same time that this second series of slits has been formed, the metal which has come under the punch projections 7—7 has been slitted as before described and a bond 15 left between the adjacent ends of the slits 14—14. The operation of the punch projections 8—8 forms slits 16—16. A repetition of the action of the punch projections 8—8 forms other slits in the same manner, so that bonds 17—17 are left between their adjacent ends.

The action of the punch 6 forces the strands of the strip down between the projections of the die 2 and also wedges the strips between the projections 7 of the punch. To automatically release the strands from the punch and die, I provide strippers, shown particularly in Figs. 1 and 2.

Figure 1:
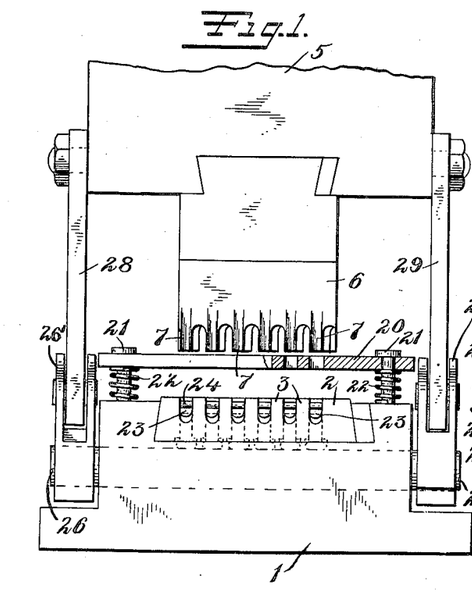
Figure 1 is a fragmentary front view of parts of the machine for slitting or lancing the metal preparatory to its expansion.
Figure 2:
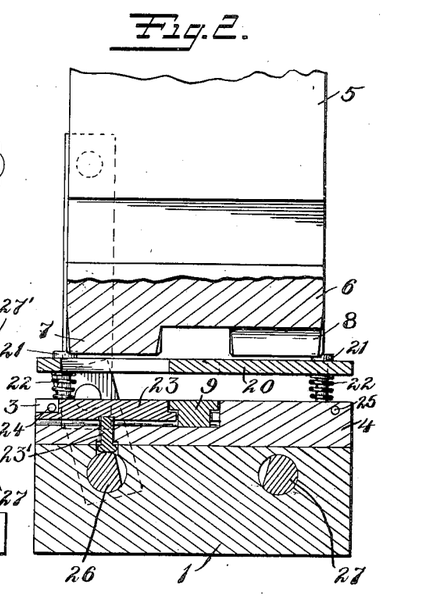
Fig. 2 is a longitudinal sectional view of the same.
Figure 3:
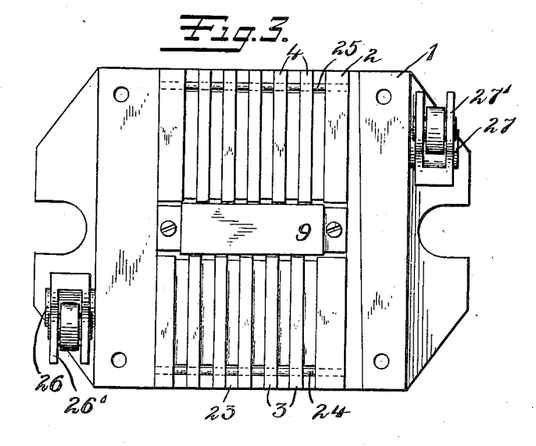
Fig. 3 is a plan view of the lower dies shown in Fig. 1.
Figure 4:
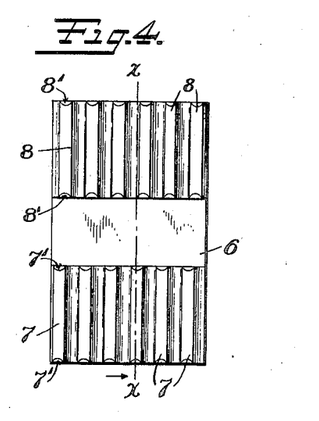
Fig. 4 is a view of the underside of the punch shown in Fig. 1.

20 is a plate having a series of openings corresponding to the punch projections. This plate is guided on headed posts 21—21 and forced upward by springs 22—22. The strip is fed between the die 2 and the plate 20. In operation the punch projections pass through the openings in the plate 20 and lance or slit the strip. When the punch is retracted, tending to carry with it the strip, the plate 20 forced upwardly by the springs 22—22, frees it automatically.

23—23 are lifters located between the projections 3—3 and 4—4 of the die. The inner ends of the lifters extend under the edges of the table 9, while the outer ends are beneath rods 24 and 25.

26 and 27 are cam shafts mounted in the bed 1 and adapted to coöperate with the lifter pins 23'. The cam shafts have crank arms 26' and 27' respectively, which are connected by links 28 and 29 to the gate or head 5. When the gate with the punch 6 moves down, the cam shafts 26 and 27 are rocked and permit the lifters 23 to fall, so that the punch may act. When the gate is retracted, the cam shafts are rotated to the position shown in Fig. 2, so as to operate the lifters and force the metal of the strips from between the projections of the die.

The metal, after being lanced or slitted, passes to the expanding portion of the mechanism. This is shown particularly in sheets, 2, 3, 4 and 5.

Figure 5:
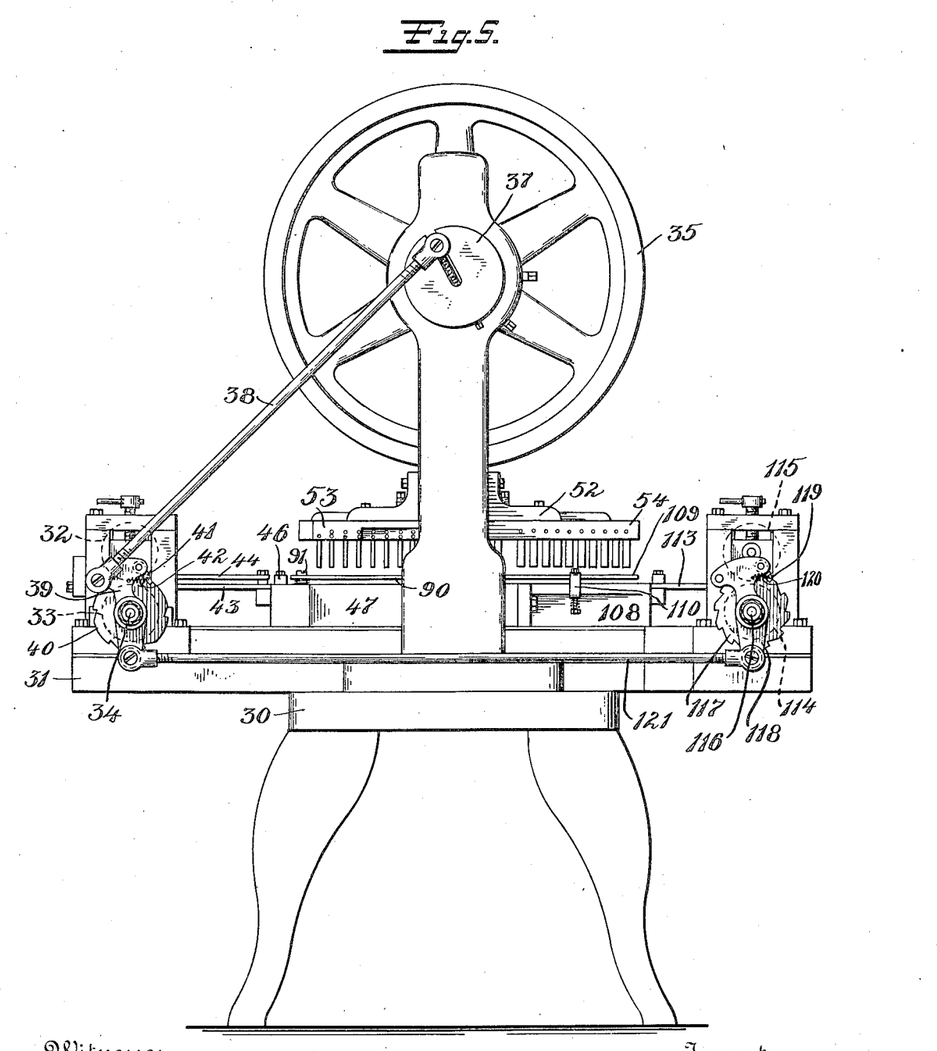
Fig. 5 is a side view of the parts of the machine for expanding and finishing the plate after it has been lanced or slitted.
Figure 6:
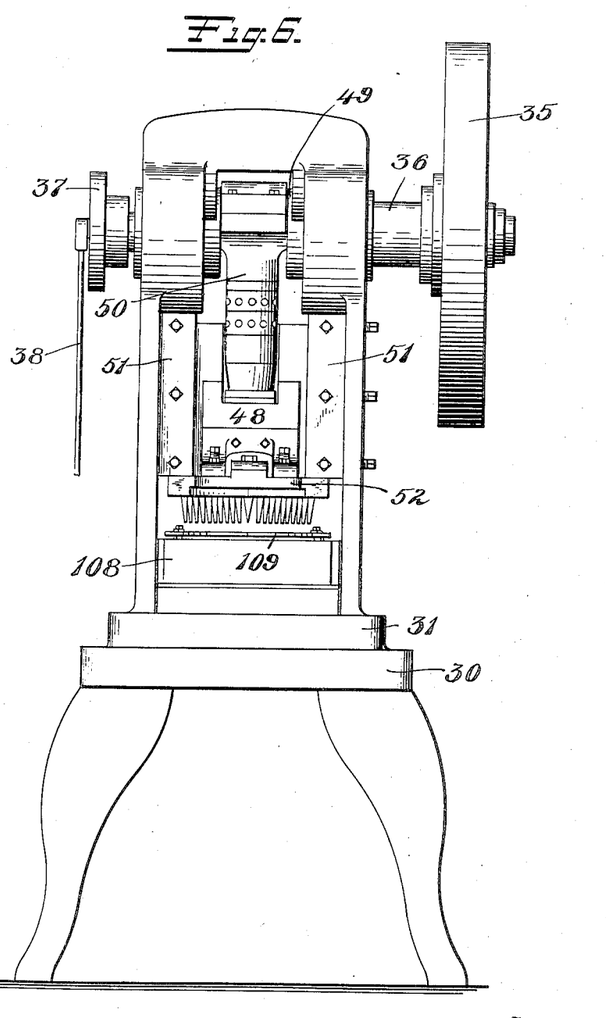
Fig. 6 is a front view or elevation of the machine, looking from the discharge end.
Figure 7:
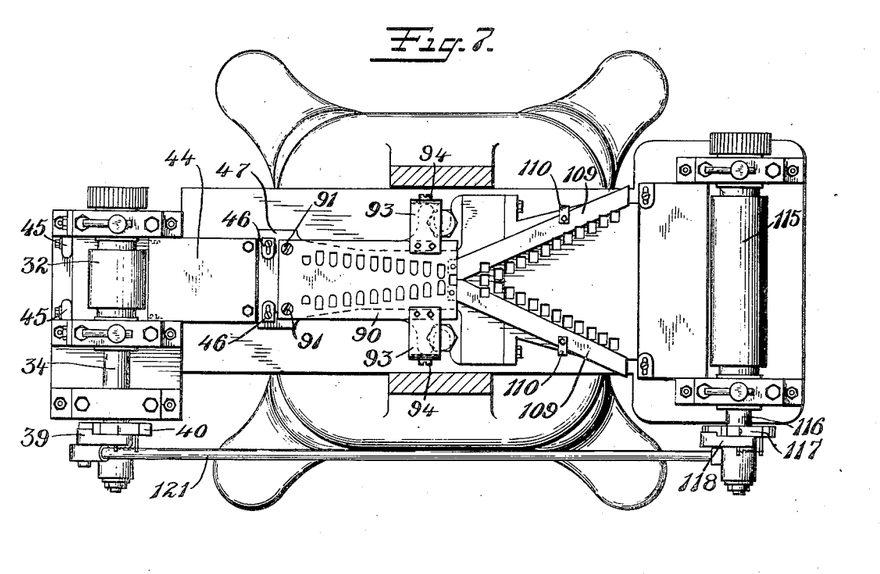
Fig. 7 is a plan view and partial section of the machine shown in Figs. 5 and 6, the upper part (including the punches and operating mechanism) being removed.

30 is the table for supporting the operating press. On the table is mounted the bed 31. At one end of the table are the two feed rolls 32 and 33, between which the slitted or lanced strip is fed.

34 is the shaft of the lower roll mounted in suitable housings.

35 is a pulley and balance wheel to which power is applied to the machine.

36 is the pulley shaft.

37 is an eccentric plate forming a crank for the connecting rod 38.

39 is a lever mounted on the roller shaft 34 to which the connecting rod 38 is attached. This lever is loose on the shaft and connects thereto by ratchet and pawl.

40 is the ratchet, 41 is a pawl, and 42 is a spring for holding it in engagement with the ratchet. The feed of the roller is therefore intermittent and determined by the length of the throw of the crank 37 and the number of teeth in the ratchet 40.

43 and 44 are the bottom and top plates of the guide passage between which the strip is fed.

45—45 are adjustable gages back of the feed rollers.

46—46 are guides or gages at the inner end of the feed channel formed by the plates 43 and 44. One or both of these guides 45 and 46 may be adjusted laterally to direct the strip as desired.

47 is the die bed for the metal during the expanding operation.

48 is the gate or head carrying the expanding punches. This gate may be raised or lowered by the rotation of pulley 35 and shaft 36 through the medium of the crank 49 and connecting rod 50.

51—51 are vertical ways for the gate.

52 is the punch carrier. This is illustrated more in detail in Figs. 8 and 9. For convenience in manufacture and construction, this carrier is formed in two parts, 53 and 54, suitably secured together.

Figures 29, 30, 31:
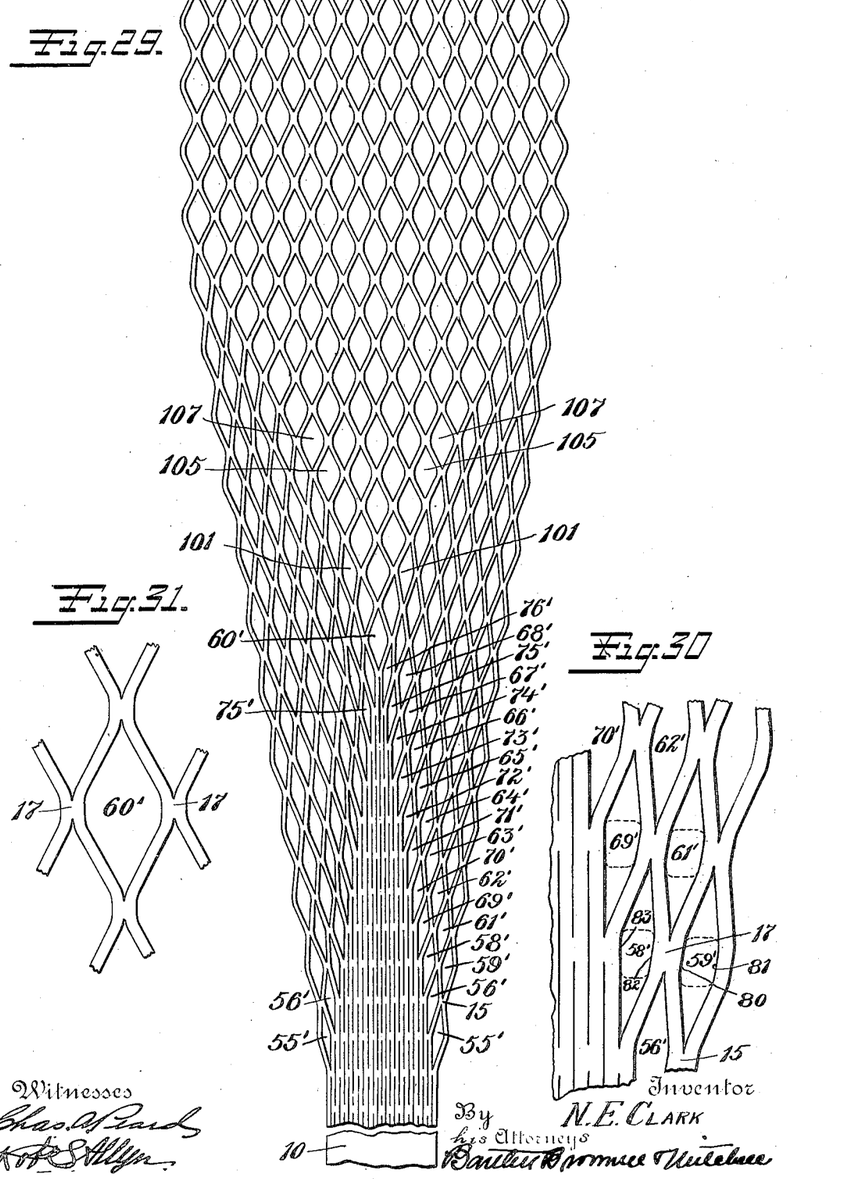
Fig. 29 shows a strip of metal part of which has passed through the machine and which illustrates the original blank, the slitted portion, the partially expanded portion, and the finally expanded portion.
Fig. 30 shows a fragment of a strip which has been acted upon by the first series of expanding punches.
Fig. 31 shows a fragment of an expanded strip in its final form after action of the sizing punches of the second series.

This slitted metal strip is fed underneath the punch carrier, and all the expansion takes place between the carrier and the die bed in substantially a horizontal plane but lateral of the direction of feed. The expansion is effected by two series of punches arranged in converging and diverging rows. The first series of punches is divided preferably into two rows. The first punch 55 which acts upon the slitted strip is shown in Figs. 11 to 14 inclusive. One of these punches is arranged on each side of the center line of movement of the feed of the strip at a distance from the center such that it will enter the outside slit in the strip and open it up, as shown at 55′ in Fig. 29. Fig. 29 is, however, shown on a different scale than the punch 55. This punch 55 is shaped so that it will enter the slit and force the side strand out and slightly backward.

56 is a punch arranged to enter the next inside alternate slit when the strip is fed forward, and open it, as shown at 56′ in Fig. 29. This slit, however, has been partially opened by the action of the punch 55 in the opening 55′.

57 is another punch similar to punch 55 arranged alongside of the punch 56, which is outside the bond 15 and which operates at the same time with the punch 56. The two punches between them draw the bond into its proper direction and prevent the strands from being unduly strained.

58 is another punch similar to punch 56 which enters and forms the opening 58′. At the same time the punch 59, which is similar to the punches 55 and 57, enters and forms the opening 59′, the bond between the openings 58′ and 59′ being directed by the two punches into such a position as to produce the least strain in the metal. A series of these punches like 55 and 56 is employed converging toward the longitudinal axis of the strip. They are arranged in two rows, as shown, and the punches of the inner row are somewhat shorter than the punches of the outer row. The operation of the punches on the inner and outer rows as soon as the strip has been fed in any length, is practically simultaneous. For this reason the punches of the inner row are made shorter, so that they do not enter until the opening in which they are to operate has been partially formed by the spreading of the strands on the outside by reason of the action of the outer row of punches. The punches may be secured in the carrier in any suitable manner.

60 is a punch arranged to operate in the center row of slits, as at 60′. This serves to expand the metal at this point and also to guide the strip and insure its being carried along in its proper line. The openings 55′, 59′, 61′, 62′, 63′, 64′, 65′, 66′, 67′, and 68′ are formed by the outer row of punches. The openings 56′, 58′, 69′, 70′, 71′, 72′, 73′, 74′, 75′ and 76′ are formed by the inner row of punches, all simultaneously. In Fig. 30 is shown on approximately a full-sized scale a fragment of the expanded metal after operation by this first series of punches. In this figure I have illustrated a fragment of the metal partially expanded, with the dotted outlines of punches in position, just having finished an operative stroke. The numbers applied to the openings are the same as the numbers applied to the punches for forming them, with the addition of indices. It will be understood, however, that all the punches of the outer row are essentially the same as the punch 55 shown in Figs. 11 to 14, and all the punches of the inner row are essentially the same as punch 56 shown in Figs. 15 to 17 inclusive. The inner surface of the punch 59 presses against the outer edge 80 of the inner strands of the mesh 59′. The bearing face of the punch is wider than the length of the bond 17. Similarly the outer face of the punch operates against the inner edge 81 of the outer strands. The next inside punch 58 forms the opening 58′, and for this purpose is located slightly in advance of the punch 59. Its outer surface presses against the inner edge 82 of the bond 17 opposite the inner face of the punch 59, and being wider than the length of the bond, it directs the bond to the proper inclination, so as to prevent undue strains in the strands particularly adjacent the outer end of the bond. The curves or bends in the strands adjacent the bond 17 are formed sufficiently remote from the end of the slit to prevent rupture of the strands and to leave the strands in proper position relative to the other adjacent punches and the openings being formed thereby. The inner face of the punch 58 bears against the outer edge 83 of the strands which have not yet been opened, and tends to hold them in a definite position.

The stock is fed forward after each stroke of the punch, as before described, substantially the length from center to center of the slits. Each of the punches of the outer row enters the next succeeding opening diagonally in line with it which has previously been formed by the next preceding punch of the inner row. Similarly, each punch of the inner row upon the next succeeding stroke of the punch carrier enters the slit immediately to the rear. The punches of the outer row being longer than the inner row open up the next succeeding inner row of slits preparatory to the entrance of the punches of the inner row. The only punch, therefore, which has to strike the slits accurately, is the first punch 55 of the outer row.

The centering punch 60 is symmetrically wedge-shaped on both sides, and serves to form the opening 60′. The slit immediately succeeding the opening 60′ is allowed to be partially opened by the action of the punches in the openings 75′ 75′ on the opposite sides, so that the punch 60 may more readily enter. This opening out is permitted by cutting back the inner faces of the punches which are to form the openings 75′.

Figure 8:
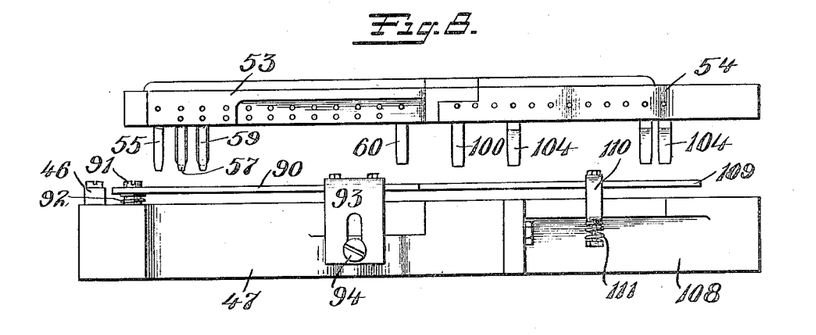
Fig. 8 is a side view on a larger scale showing the punch carrier with some of the punches and the die bed and stripper plate.
Figure 10:
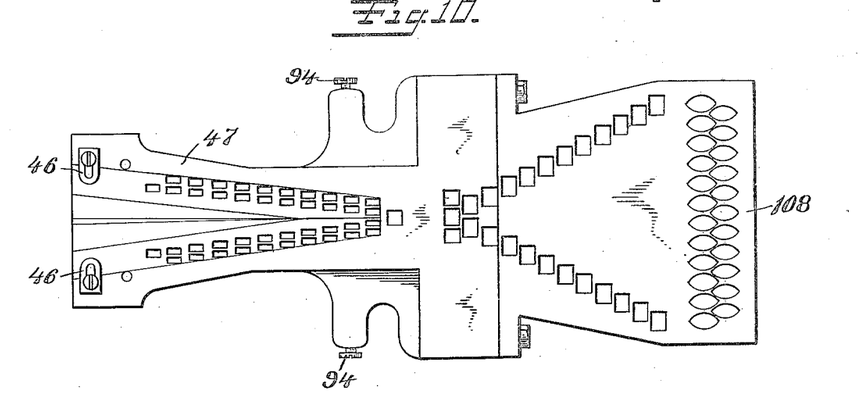
Fig. 10 is a plan view of the die bed.
Figures 11, 12, 13, 14, 15, 16, 17:
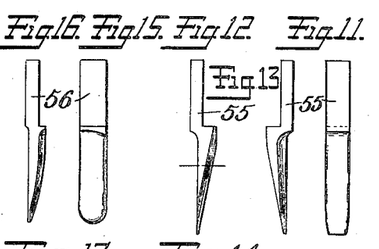
Figs. 11 to 14 inclusive are detail views of one of the punches for starting the expanding operation.
Figs. 15 to 17 inclusive are detail views of one of the punches for operating upon the stock in conjunction with the starting punches and directing the bond in the expanding operation.
Figure 18:
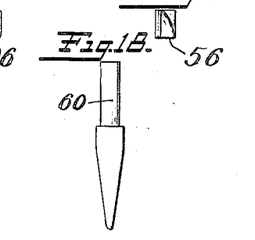
Fig. 18 is a detail view of a center punch for opening the slits of the center row.

The die bed 47 has a series of openings corresponding substantially in position and size to the largest operative cross section of the punches, so that anvil-like surfaces are provided for supporting the strands and bonds of the expanded metal. When the punches are retracted they have a tendency to carry with them the expanded strip. To prevent this, I provide a stripper plate 90 having a series of passages approximately corresponding to the punches and beneath which the metal is fed. This plate 90 is mounted at its left end on headed posts 91 and pressed upward by springs 92, as seen in Fig. 8. The right hand end of the plate 90 is guided by brackets 93—93, which have slotted vertical arms through which pass the guide screws or bolts 94, as seen in Figs. 8 and 10. This end of the plate is further supported as will be hereafter described.

For certain purposes the mechanism thus far described may be said to be complete, as the product is expanded metal of considerably increased area and having openings depending upon the length of the slits and the size of the punches. When the punch carrier is brought down for the expanded action, the punches pass through the stripper plate 90, expand the metal and then press the stripper down against the upper surface of the expanded metal and flatten it out to a certain extent. The stroke or position of the punch carrier might be made less so that the stock would not be flattened at all. For certain classes of work it is desirable that the expanded metal have more or less irregularity. The general expansion of the metal, however, is in its original horizontal plane.

Figure 9:
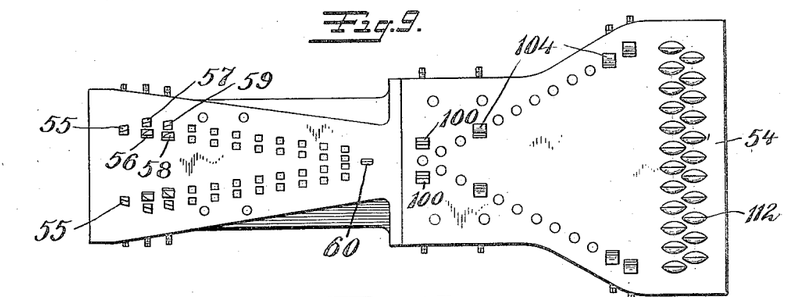
Fig. 9 is a view of the underside of the punch carrier and punches.
Figures 19, 20, 21:
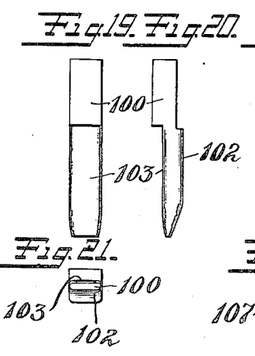
Figs. 19 to 21 inclusive are detail views of one of the punches for holding the bonds and strands of the partially expanded metal during the continued expanding operation by other punches, and preventing undue expansion of the central portion of the strip.
Figures 22, 23, 24:
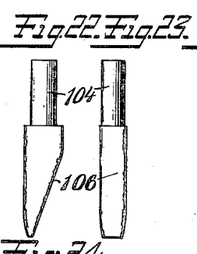
Figs. 22 to 24 inclusive are detail views of one of the punches for completing the expanding action and sizing the mesh.
Figure 24:
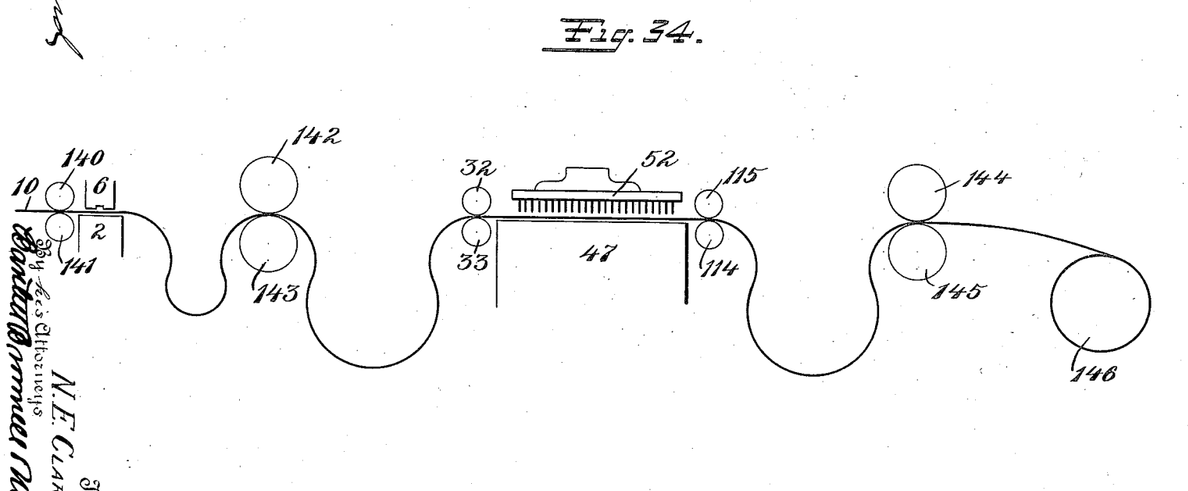

I prefer to carry out the expansion a step further. This is accomplished by a second series of punches carried by the holder 54. These punches are arranged in rows inclined toward the axis of the line of feed of the strip, but diverging in the opposite direction to the punches of the first series before described. In carrying out what may be termed this second step or expansion, I have found it desirable to employ holding punches such as the punch 100 shown in Figs. 19 to 21. These punches are located as shown in Fig. 9 and are brought into operation in the openings numbered 101 in Fig. 29. The outer surface 102 serves to expand the metal partially on the outer side, while the inner face 103 serves to hold the adjacent metal on the inner side and prevent undue expansion. The two punches being arranged in the opposite openings 101, hold the metal in its proper position and prevent side pulls, which might result in improper action of the expanding punches beyond. The expanding punches are all substantially like punch 104 shown in Figs. 22 to 24. These operate in the openings 105, the outer face 106 of each punch acting against the inner edge of the opening and forcing the metal outward and expanding not only the adjacent metal, but all the metal lying between the two opposite punches. The result is that it is not necessary in some cases to employ punches for any openings in the second series before the openings 105, except the holding punches 100 just described. The width of each face of each punch is preferable greater than the length of the bonds and the corners are rounded, for the purpose before described of preventing rupture.

The number of punches employed, their size and arrangement, the presence or omission of any of the punches of either series, will depend largely upon the thickness of the metal, its ductility, and the size and shape of mesh desired. The same punches may, however, be used for different thicknesses of metal within quite wide limits, but for special classes of work it may be necessary to design special punches, as will be readily understood by one understanding the principles of sheet metal working.

After the metal comes from the machine thus far described, it may be passed through other machines of a similar character and larger size, or the second series of punches may be increased in number. The punches of this second series may also be arranged in a plurality of rows, as the punches of the first series, getting a more gradual expansion. There is not, however, in the machine herein shown, the same necessity for a double row of punches in the second series as there is for a double row in the first series, because the metal has been given more nearly its final direction when it leaves the first series of punches, the further expansion being simply one of distance or degree. The expansion as herein described takes place laterally relative to the length of the stock and its direction of feed, the length being somewhat diminished in the process, depending upon the degree of expansion. The metal of the strands is, however, not materially elongated.

108 is the die bed beneath the second series of punches provided with openings corresponding to the punches. The metal when acted on by the second series of punches has a tendency to be retracted with them. I consequently provide a stripper plate 109, which, however, is arranged only along the outer edges of the punches. The plate might, however, be formed in one piece, as plate 90, with passages for the punches, but I prefer to form it as shown, so as to permit closer examination of the metal during the final expanding action. This stripper plate is connected at its left hand end, as shown in Figs. 7 and 8, to plate 90, and guided at this point. It is also supported on brackets 110—110, which are yieldingly held up by springs like 111. When the punches are withdrawn from the metal, the plates 90 and 109 hold down the expanded metal and strip it, as it is termed, from the punches.

In some cases it is desired to give a further form or shape to the expanded metal. This may be accomplished by means of an additional set of punches, as 112, as shown in Fig. 9. These do not act as true expanding punches, but simply bend the strands into shape corresponding to their outline. In this way different designs may be produced. Of course, when such punches are employed, the die bed will be provided with corresponding openings, so that the metal around the openings will act as an anvil to support the expanded metal. When such punches are employed, the stripper plate will, of course, be extended to correspond with them, or a separate stripper plate might be employed if desired.

When the sheet of expanded metal leaves the punches it is complete, but to give greater uniformity of thickness and finish in some cases, I prefer to employ rollers 114 and 115. The roller 114 has a shaft 116, to which is attached the ratchet 117. 118 is a lever pivoted on the shaft carrying the pawl 119 pressed into engagement with the ratchet by spring 120. This lever is connected by a rod 121 to lever 39, so that the lever is oscillated in the same manner that lever 39 is oscillated, as before described, causing step by step rotation of the roller 114, and a similar rotation of the roller 115 which is geared to it. These rollers not only serve to smooth out or finish the product, but they also produce a pull upon it so as to assist in the feed of the strip.

The dimensions and rates of movement of the rolls at each end of the machine must be properly proportioned to the percentage of expansion and contraction of the metal. Even when the discharge rolls 114 and 115 are employed, it is not always necessary to drive them positively, but they may be disconnected from the rod 121 and the feed, and act solely as a guide for the metal as it is forced through by the action of the feed rolls 32 and 33. When the punches are brought into action as before described, the metal at that instant, while being held stationary relative to its original strip, is foreshortened relative to the position of the rolls 114 and 115. This causes backward rotation of the rolls which is permitted by the relative position of the pawl 119 and the teeth of the ratchet 117. The angular backward movement of the rollers in any event is less than the pitch of the ratchet teeth. The stock, however, might be released by releasing the pressure of the rollers during the duration of action of the punches.

Figure 32:
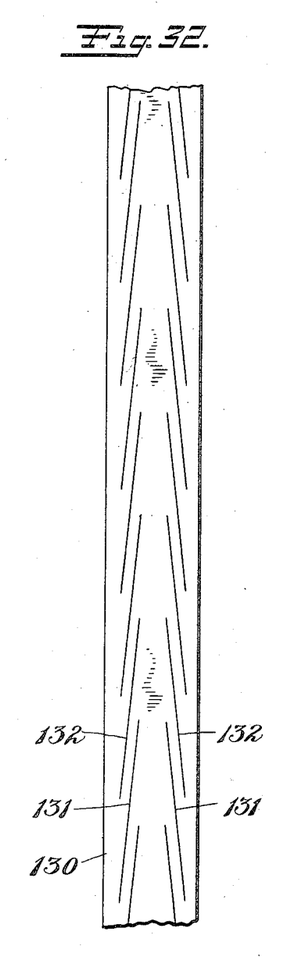
Fig. 32 shows another form of strip lanced or slitted obliquely or at an angle relative to the length of the strip.
Figure 33:
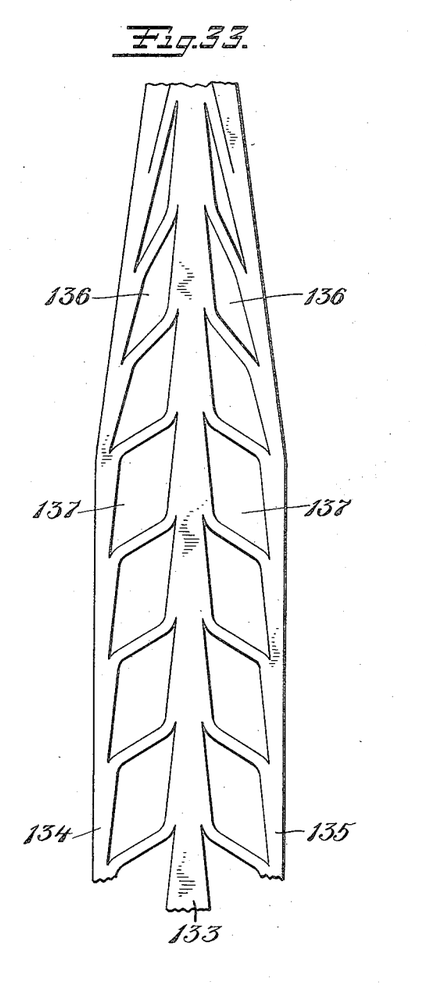
Fig. 33 shows the same in the different stages of expansion.

Figs. 32 and 33 show another form of expanded metal which may be produced according to my improved method. In this it will be noted that the strip 130 has the alternating but inclined slits 131 and 132. In the particular form shown they are arranged in pairs oppositely positioned, and when expanded as shown in Fig. 33, provide a strip which has three main strands 133—134—135, connected by shorter strands between the main strands. This requires the operation of punches in the openings 136—136 and 137—137 only. Greater or less expansion may be produced by increasing the size of the punches. More gradual or quicker expansion may be produced by varying the number of punches. There is, of course, in this arrangement, no centering line of punches as in the other form. It would be obvious that for certain classes of work it might be desirable to form an expanded strip having only one longitudinal row of openings, such as would be represented by one-half of the strip shown in Fig. 33.

The invention is adapted to the formation of expanded metal of various designs and for various purposes. I do not, therefore, limit myself to the production of metal as herein shown, nor do I limit myself to the particular mechanism herein shown for the purpose of slitting the metal. So also the two series of expanding punches may be arranged in separate machines. The blank strips of metal when purchased are ordinarily in rolls or hoops. These strips after slitting may be rolled up again and stored or transported preparatory to the expanding operation. For instance, they may be again rolled up for transportation or other purposes. The width of the expanded metal may be anything desired, depending only upon the original width of the stock and the size and arrangement of the machine. This method of manufacture, which makes it possible to produce expanded metal and coil it up for transportation and storage, I consider of great importance, and, so far as I am aware, is entirely novel. By its use it is possible to employ expanded metal in building constructions in continuous strips, where heretofore it has been impossible, it having been the custom to weld or secure the ends of short strips together.

In Fig. 34, 140 and 141 are feed rolls in front of the lancing punches, 6 and 2. 142 and 143 are smoothing rolls. 144 and 145 are finishing rolls, and 146 indicates a coil or roll of finished expanded metal, all illustrating mechanism for the continuous process.

What I claim is:—

1. In a machine for forming expanded metal, means for slitting a strip of metal longitudinally, means for flattening it, and means for opening the slits and maintaining all the bonds in a single plane.

2. In a machine for forming expanded metal from slitted strips, means for partially opening the slits laterally in the original plane and maintaining all the bonds in a single plane, and means for further extending the openings to give a permanent set to the metal.

3. In a machine for forming expanded metal, means for laterally expanding a slitted strip and means for rolling down and flattening the expanded strip.

4. In a machine for metal working, means for intermittently feeding a strip of sheet metal step by step, a press and reciprocating punches carried thereby for intermittently expanding the metal laterally of the line of feed.

5. A machine for expanding a longitudinally slitted sheet, including means for flattening and setting a slitted sheet, means for expanding it laterally and means for feeding away the expanded sheet.

6. In a machine for metal working, means for feeding a strip of sheet metal intermittently step by step, and punches for expanding the metal of the strip and maintaining the bonds in substantially its original plane.

7. A machine for expanding a longitudinally slitted sheet, including, rolls for flattening setting and feeding the slitted sheet, means for expanding the sheet laterally and rolls for flattening and feeding away the expanded product.

8. In a machine for expanding a slitted sheet, means for feeding a sheet longitudinally of the slits, means for expanding the sheet laterally and means for flattening the product and setting the bonds and strands in a single plane.

9. In a machine for expanding metal, a series of expanding punches, arranged in two rows, the punches of the inner row being shorter than those of the outer row for expanding after the latter.

10. In a machine for expanding slitted metal strips, punches and means for operating them to turn the connecting bonds between the reticulations in line with the general direction of the edge of the expanding portion of the strip.

11. In a machine for expanding slitted sheets, means for feeding a sheet intermittently, a plurality of punches for entering the slits and engaging the side edges of the bonds and adjacent portions of the strands, the width of the operating face of each punch being greater than the length of a bond.

12. In a machine for expanding slitted metal strips, a row of punches for holding certain portions of the strip and a row of punches for expanding other portions while the holding punches are in action.

13. In a machine for working sheet metal, the combination of a reciprocating press for expanding the metal, a roll for flattening the expanded metal strip, and means for feeding the strip step by step at the proper time in conjunction with the operation of the press.

14. In a press for expanding sheet metal strips, a series of reciprocating expanding punches spaced apart from each other and arranged in converging lines.

15. In a machine for expanding sheet metal, means for feeding the strip step by step, and a series of punches and means for bringing them into operation intermittently to gradually expand the metal as it is fed step by step.

16. In a machine for expanding sheet metal, a series of punches arranged in two converging rows, the punches of the inside row being shorter than the punches of the outside row for expanding after the latter.

17. In a machine for expanding slitted sheet metal strips, a series of punches entering in the slits for partially expanding the metal between the slits, means for feeding the strip step by step, and punches for entering the partially opened slits and further expanding the metal.

18. In a machine for expanding sheet metal, a bed-plate, a cover-plate, and a series of expanding punches, entering within the slits, the cover-plate and bed-plate having passages for the punches.

19. In a machine for expanding slitted sheet metal, a pair of rolls for feeding, a series of punches for entering and opening the slits, and a pair of plain cylindrical rolls for delivering and flattening the expanded sheet to set the bonds and strands in a single plane.

20. In a machine for expanding slitted metal sheets, a series of opening punches arranged in converging rows, and a series of punches for further opening arranged in diverging rows.

21. In a machine for expanding slitted metal sheets, a series of starting punches, and a series of directing punches arranged to enter the slits laterally adjacent thereto.

22. In a machine for expanding slitted metal sheets, a series of starting punches, and a series of directing punches arranged to enter the slits laterally adjacent thereto but slightly in advance thereof.

23. In a machine for expanding slitted metal sheets, a series of starting punches arranged in converging rows, and a series of directing punches similarly arranged and laterally adjacent thereto.

24. In a machine for expanding sheet metal, a series of starting punches arranged in converging rows, the width of the lateral bearing surface of each punch being greater than the length of bond.

25. In a machine for expanding sheet metal, a series of starting punches arranged in converging rows, and a series of directing punches similarly arranged and of greater width than the starting punches in the direction of line of feed of the stock.

26. In a machine for expanding sheet metal, a series of punches arranged in converging rows, each punch having its lateral bearing surface inclined to the direction of feed of the stock.

27. In a machine for expanding sheet metal, a series of starting punches arranged in converging rows, a centering punch, a pair of oppositely positioned holding punches arranged beyond the centering punch, and a plurality of expanding punches arranged beyond the holding punches.

28. In a machine for expanding sheet metal, a pair of oppositely positioned starting punches, each punch being formed with rounded corners and having its bearing faces inclined forwardly and outwardly relative to the direction of feed of the stock.

29. In a machine for expanding sheet metal, a pair of oppositely positioned starting punches, each punch having its bearing faces inclined forwardly and outwardly relative to the direction of feed of the stock, and a pair of directing punches located laterally adjacent thereto and having their inner bearing surfaces substantially parallel to the direction of feed of the stock and having their outer bearing surfaces inclined and substantially parallel to the bearing surfaces of the starting punches.

30. In a machine for expanding sheet metal, a die bed, a reciprocatory head, and a series of expanding punches carried thereby and arranged in converging rows.

31. In a machine for expanding sheet metal, a die bed, a reciprocatory head, a series of expanding punches carried thereby and arranged in converging rows, and a stripper plate located between the head and the die bed.

32. In a machine for expanding sheet metal, a pair of feed rolls, a series of expanding punches, means for operating the feed rolls and the expanding punches, a pair of delivery rolls, and means for rotating the delivery rolls at a less peripheral speed than the peripheral sped of the feed rolls.

33. In a machine for expanding sheet metal, a pair of feed rolls, a reciprocating head or gate, a series of punches carried thereby for expanding laterally of the line of feed, and a pair of delivery rolls.

34. In a machine for expanding sheet metal, a die bed, a plate for flattening and stripping the stock, a reciprocating head or gate, and a series of expanding punches carried thereby.

35. In a machine for expanding sheet metal, a die bed having a series of openings or recesses, a head or gate, and a series of expanding punches carried thereby and arranged in two rows inclined at an acute angle to the line of feed.

36. In a machine for expanding sheet metal, a die bed, a gate or head, and two series of expanding punches carried thereby, the first series being arranged in rows converging forward toward the center line of feed of the stock, and the other series being arranged diverging outwardly and forwardly from the center line.

37. In a machine for expanding sheet metal, a die bed, a gate or head, two series of expanding punches carried thereby, the first series being arranged in rows converging forward toward the center line of feed of the stock, and the other series being arranged diverging outwardly and forwardly from the center line, and stripper plates arranged between the gate and the die bed.

38. In a machine for manufacturing expanded metal, means for lancing or slitting the metal, a die bed, a reciprocating head and wedge-shaped punches carried by said head for expanding the previously lanced or slitted metal and means for flattening the metal at the end of the stroke of the punches.

39. In a machine for expanding longitudinally slitted sheets, a plurality of directing punches each having one face substantially parallel with the line of feed and its opposite face inclined forwardly and outwardly.

40. In a machine for expanding slitted sheets a plurality of directing punches, and a plurality of starting punches, each of the latter punches having their outer and inner faces inclined forwardly and outwardly.

41. In a machine for expanding slitted sheets a plurality of starting punches, and a plurality of directing punches each of the latter having one face in line with the direction of the slits and its opposite face inclined forwardly and outwardly.

42. In a machine for expanding slitted sheets a plurality of starting punches and a plurality of coöperating directing punches, each of the latter having one face substantially in line with the direction of the slits and its opposite face inclined thereto, each of the opposite faces of the starting punches being substantially parallel with the inclined face of the corresponding directing punches.

43. In a machine for expanding previously slitted sheet metal, a die, a reciprocating head, wedge-shaped punches carried by said head for opening the slits and forming the expanded sheet, and sizing punches for finishing or shaping the previously opened slits.

44. In a machine for expanding sheet metal, a die bed, a reciprocating head, a series of expanding punches carried by said head and arranged in converging rows, and a series of sizing punches arranged substantially across the line of feed of the metal for finishing or shaping the expanded metal.

45. In a machine for expanding sheet metal, a die bed, a reciprocating head, two series of expanding punches carried thereby and arranged in rows converging toward the longitudinal center of the line of feed of the metal, and a series of sizing punches arranged in rows extending entirely across the line of feed of the metal.

46. In a machine for expanding slitted sheets, a plurality of starting punches, a plurality of directing punches, a pair of holding punches and a plurality of finishing punches.

47. A machine for forming expanded sheet metal, which includes means for intermittently feeding a slitted strip, and means for bending successively row after row of inclined rows of the material between the slits in a direction lateral to the line of feed and in substantially the original plane.

48. A machine for expanding slitted sheet metal, which includes means for intermittently feeding the slitted sheet and means for engaging the edges of an inclined row of bonds so as to bend the connected strands gradually in the direction of the original plane of the stock.

49. A machine for expanding slitted sheet metal, which includes means for intermittently feeding the slitted sheet and means for engaging the edges of an inclined row of bonds so as to bend the connected strands gradually in the direction of the original plane of the stock, and means for flattening the bonds after the bending of the strands.

50. A machine for forming expanded metal, which includes means for feeding a longitudinally slitted sheet, and means for bending individual strands outwardly along two rows converging forwardly in the direction of feed.

51. A machine for expanding a slitted sheet, which includes means for the simultaneous bending of four inclined rows of strands and means for operating said bending means.

52. A machine for expanding a slitted sheet, which includes converging rows of expanding members, diverging rows of expanding members and means for operating all of said members for the simultaneous bending of converging and diverging rows of strands.

53. A machine for expanding sheet metal which includes means for feeding the stock, two rows of expanding members arranged along lines inclined relative to the direction of feed, two other rows of expanding members arranged along two other lines inclined relative to the direction of feed and means for bringing said members into operation for successively bending the strands first along two inclined rows and then along two other inclined rows.

54. A machine for expanding slitted sheet metal, which includes two converging rows of expanding members and means for operating said members for engaging portions of the stock along two converging rows and expanding it laterally.

55. A machine for expanding slitted sheet metal, which includes means for engaging portions of the stock along two converging rows and means for then engaging along two other rows, and expanding it laterally.

56. A machine for expanding slitted sheet metal, which includes means for feeding the strip longitudinally, means for flattening it so as to partially open the slits, means for expanding the strip laterally, and means for flattening the expanded sheet to set the bonds and strands in the same plane.

57. A machine for expanding slitted sheet metal which includes two rows of wedge-shaped expanding punches, the punches of one row of punches being spaced apart so as to simultaneously enter the slits of one row of slits, the punches of the other row of punches being arranged to simultaneously enter the slits of the adjacent row of slits which have been partially opened by the punches of the first mentioned row of punches, means for feeding the stock and means for operating the punches for expanding the slitted sheet.

58. A machine for expanding a slitted sheet which includes two pairs of rows of expanding members, the members of one pair of rows of expanding members being spaced apart so as to engage both edges of one row of bonds to bend the adjacent strands, the members of the other pair of rows of expanding members being spaced apart so as to engage both edges of another row of bonds to bend the strands adjacent thereto, means for feeding the stock and means for operating the punches for expanding the sheet along the directions of the two rows of bonds.

59. A machine for expanding slitted metal, which includes means for engaging a plurality of bonds first on one edge and then on the other for directing the bonds and bending the strands, and means for setting the bonds and strands in the same plane.

60. A machine for forming expanded metal from a slitted sheet, including means for feeding a sheet in a direction longitudinal of the slits, means for guiding the strip and means for expanding the strip laterally by engagement along forwardly converging lines.

61. In a machine of the character described, the combination of two adjacent rows of reciprocating punches, the first row of punches forming one row of meshes and the second row of punches coacting with the meshes of the same row to hold the same while the next row of meshes is being formed by the first row of punches.

62. In a machine for forming expanded metal, a series of devices for forming a row of meshes and a second series of devices adjacent the first series for again acting upon the row of meshes just formed and holding the same while and as the next row of meshes is being formed.

63. In a sheet metal expanding machine, two rows of devices acting simultaneously along adjacent lines to open one row of meshes and produce a secondary setting action upon the previously opened row of meshes.

64. In a machine for expanding a slitted strip of metal, rolls for feeding and flattening the slitted strip, a punch for entering successive slits and opening the same and a second pair of rolls for flattening the product and feeding the same out.

65. In a machine for forming expanded metal, the combination of rolls for feeding slitted stock longitudinally of the slits and setting the bonds and strands and means for expanding the rolled and flattened stock laterally of the line of feed.

66. In a machine of the character described, means for feeding a strip, one or more punches for forming successive meshes and rolls for flattening and feeding out the product.

67. In a metal working machine, cutters for slitting a strip longitudinally, a punch for opening successive slits laterally and means for flattening the expanded product and setting the bonds and strands in a common plane.

68. In a metal working machine, rolls for feeding sheet metal stock, punches for forming successive meshes in the stock and rolls for flattening the product and setting the bonds and strands in a common plane.

69. In a machine for making expanded metal, rolls for feeding the stock, means for guiding the stock, a series of punches for expanding the stock, means for stripping the stock from said punches, a second series of punches for further expanding the stock, means for stripping the stock from said second series of punches and rolls for feeding the product away from the machine.

70. In a machine for forming expanded metal, the combination of a die bed for supporting the stock, means for intermittently feeding the stock forward over the die bed, a reciprocating head mounted above the die bed, expanding punches carried by the head and disposed in diverging rows inclined to the line of feed of the stock and means for operating the head and the punches carried thereby to form successive inclined rows of meshes.

71. In a machine for forming expanded metal, the combination of a die bed for supporting the stock, means for intermittently feeding the stock forward over the die bed, a reciprocating head mounted above the die bed, expanding punches carried by the head and disposed in diverging rows inclined to the line of feed of the stock, means for operating the head and the punches carried thereby to form successive inclined rows of meshes and means located between the head and the die bed for holding the stock down as the punches are withdrawn.

72. In a machine for forming expanded metal, a die bed, means for intermittently feeding a strip of sheet metal forwardly over the die bed, a reciprocating head mounted above the die bed, punches carried by said head disposed in two rows diverging forwardly in the direction of feed of the strip and means for operating the head and the punches carried thereby to form successive diverging rows of meshes while the unexpanded portion of the strip is stationary.

73. In a metal working machine, a die bed, means for guiding a strip of sheet metal thereto, means for intermittently feeding the strip forward step by step, a reciprocating head mounted above the die bed, a series of punches carried by the head arranged in rows extending diagonally of the strip whereby to progressively expand successive diagonally disposed areas of the strip, means for operating the head and the punches carried thereby, and a stripper arranged to hold the strip as the punches are withdrawn.

74. In a machine for forming expanded metal, dies for supporting the stock, means for feeding the stock intermittently forward over the dies, a punch head reciprocating above the dies, a punch carried by said head, two series of punches on the head disposed in rows inclined to the line of feed and arranged on lines inclined in opposite directions from the first mentioned punch, said punches acting on the stock in coöperation with the dies as the head is reciprocated for progressively forming meshes.

75. In a machine for forming expanded metal, dies for supporting the stock, means for feeding the stock intermittently forward over the dies, a punch head reciprocating above the dies, a punch carried by the head and centrally disposed with respect to a strip of stock being acted upon, and two rows of punches carried by the head, arranged on lines inclined with respect to the line of feed of the stock and diverging from the centrally disposed punch, said punches acting upon portions of the stock to progressively form meshes.

NORRIS ELMORE CLARK.

Witnesses:
A. V. BROCK,
D. G. CLARK.